(12) United States Patent
Valero et al.

(10) Patent No.: US 12,031,431 B2
(45) Date of Patent: Jul. 9, 2024

(54) DOWNHOLE ACOUSTIC WAVE GENERATION SYSTEMS AND METHODS

(71) Applicant: Schlumberger Technology Corporation, Sugar Land, TX (US)

(72) Inventors: Henri-Pierre Valero, Paris (FR); Hugues Dupont, Abbeville (FR); Pierre Clery, Abbeville (FR); Pierre-Yves Corre, Abbeville (FR); German Garcia, Katy, TX (US); Alejandro Martinez Pereira, Katy, TX (US); Hadrien Dumont, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/664,744

(22) Filed: May 24, 2022

(65) Prior Publication Data

US 2023/0383649 A1    Nov. 30, 2023

(51) Int. Cl.
    *E21B 49/10*    (2006.01)
    *E21B 33/124*   (2006.01)
    *E21B 49/08*    (2006.01)

(52) U.S. Cl.
    CPC .......... *E21B 49/10* (2013.01); *E21B 33/1243* (2013.01); *E21B 49/088* (2013.01)

(58) Field of Classification Search
    CPC ........ E21B 28/00; E21B 43/003; E21B 47/18; E21B 49/088; E21B 49/10
    See application file for complete search history.

(56) References Cited

U.S. PATENT DOCUMENTS

| 2,747,401 A * | 5/1956 | Doll .................. E21B 49/10 73/152.05 |
| 4,507,957 A * | 4/1985 | Montgomery .......... E21B 49/10 166/100 |
| 4,862,990 A | 9/1989 | Cole |

(Continued)

FOREIGN PATENT DOCUMENTS

| NO | 321471 B1 * | 5/2006 | ............. E21B 21/08 |
| WO | 2021126946 A1 | 6/2021 | |

OTHER PUBLICATIONS

Universal Class, "The Physics Behind Acoustic Waves", 2021, 10 pages (Year: 2021).*

(Continued)

*Primary Examiner* — Jennifer H Gay
(74) *Attorney, Agent, or Firm* — Michael L. Flynn

(57) ABSTRACT

Systems and methods presented herein provide for the generation of acoustic waves for acoustic stimulation, as well as for analysis of subterranean formations, using downhole tools and associated equipment that are not conventionally designed to do so. For example, in certain embodiments, formation testing tools, formation, measurement tools, inflatable packers, and so forth, may be controlled by control systems to, for example, create pressure pulses that generate the acoustic waves. In addition, in certain embodiments, a tool conveyance system that conveys a formation testing or measurement tool into a wellbore may include acoustic receivers that may detect the acoustic waves after they reflect from subterranean features of the formation.

11 Claims, 9 Drawing Sheets

(56) References Cited

U.S. PATENT DOCUMENTS

| | | | | |
|---|---|---|---|---|
| 5,672,819 | A * | 9/1997 | Chin | E21B 49/008 73/152.41 |
| 7,124,819 | B2 * | 10/2006 | Ciglenec | E21B 49/10 166/107 |
| 7,296,462 | B2 * | 11/2007 | Gregory | E21B 49/088 73/152.51 |
| 7,458,419 | B2 * | 12/2008 | Nold, III | E21B 49/10 166/264 |
| 7,654,321 | B2 * | 2/2010 | Zazovsky | E21B 49/10 166/264 |
| 7,665,356 | B2 * | 2/2010 | Ramakrishan | E21B 49/008 166/382 |
| 8,322,416 | B2 * | 12/2012 | Pop | E21B 33/1243 166/264 |
| 8,448,703 | B2 * | 5/2013 | Ross | E21B 49/10 166/250.1 |
| 9,146,333 | B2 * | 9/2015 | Slapal | E21B 49/10 |
| 9,222,352 | B2 * | 12/2015 | Hoefel | E21B 49/088 |
| 9,416,606 | B2 * | 8/2016 | Harms | E21B 21/10 |
| 10,316,648 | B2 * | 6/2019 | Swett | E21B 47/107 |
| 10,738,607 | B2 * | 8/2020 | Proett | E21B 49/10 |
| 10,982,539 | B2 * | 4/2021 | Khan | E21B 43/26 |
| 11,073,012 | B2 * | 7/2021 | Jones | E21B 17/028 |
| 11,168,562 | B2 * | 11/2021 | Eng | E21B 49/087 |
| 11,230,923 | B2 * | 1/2022 | Proett | E21B 49/008 |
| 11,339,652 | B1 * | 5/2022 | Alshammari | E21B 17/05 |
| 11,460,443 | B2 * | 10/2022 | Al-Huwaider | E21B 49/0875 |
| 11,650,346 | B2 * | 5/2023 | Chang | E21B 47/107 73/152.16 |
| 2001/0023614 | A1 * | 9/2001 | Tubel | G01V 1/40 73/152.39 |
| 2003/0026166 | A1 | 2/2003 | Aronstam | |
| 2003/0167834 | A1 * | 9/2003 | Weintraub | E21B 49/10 73/152.05 |
| 2004/0173351 | A1 * | 9/2004 | Fox | E21B 49/10 166/264 |
| 2004/0216874 | A1 * | 11/2004 | Grant | E21B 49/082 166/264 |
| 2005/0115716 | A1 * | 6/2005 | Ciglenec | E21B 49/081 166/373 |
| 2006/0076132 | A1 * | 4/2006 | Nold, III | E21B 49/10 166/264 |
| 2006/0248949 | A1 * | 11/2006 | Gregory | E21B 49/088 73/152.51 |
| 2008/0156487 | A1 * | 7/2008 | Zazovsky | E21B 49/10 166/264 |
| 2009/0007651 | A1 * | 1/2009 | Ramakrishan | E21B 41/0064 175/25 |
| 2010/0157737 | A1 | 6/2010 | Miller et al. | |
| 2010/0175925 | A1 * | 7/2010 | Ciglenec | E21B 49/10 175/107 |
| 2010/0319912 | A1 * | 12/2010 | Pop | E21B 49/10 166/264 |
| 2011/0011576 | A1 | 1/2011 | Cavender et al. | |
| 2011/0114310 | A1 * | 5/2011 | Ross | E21B 49/10 166/250.17 |
| 2012/0152533 | A1 * | 6/2012 | Hoefel | E21B 49/088 166/264 |
| 2014/0111347 | A1 * | 4/2014 | Slapal | E21B 49/088 340/854.6 |
| 2014/0131029 | A1 * | 5/2014 | Harms | E21B 17/1078 166/66.4 |
| 2015/0176392 | A1 * | 6/2015 | Corre | E21B 47/005 166/250.01 |
| 2015/0331132 | A1 * | 11/2015 | Gao | E21B 47/107 73/152.32 |
| 2016/0053612 | A1 * | 2/2016 | Proett | E21B 17/1021 166/264 |
| 2016/0273335 | A1 * | 9/2016 | Quintero | G01V 1/226 |
| 2016/0326866 | A1 * | 11/2016 | Swett | B06B 1/0614 |
| 2018/0188401 | A1 * | 7/2018 | Donderici | G01V 1/42 |
| 2019/0153860 | A1 * | 5/2019 | Khan | E21B 49/10 |
| 2020/0217195 | A1 * | 7/2020 | Proett | E21B 49/008 |
| 2021/0048548 | A1 * | 2/2021 | Chang | E21B 47/107 |
| 2021/0164342 | A1 * | 6/2021 | Jones | E21B 49/082 |
| 2021/0246782 | A1 * | 8/2021 | Eng | E21B 49/087 |
| 2022/0136388 | A1 * | 5/2022 | Alshammari | E21B 49/08 166/264 |
| 2022/0260530 | A1 * | 8/2022 | Al-Huwaider | E21B 47/107 |
| 2022/0389793 | A1 * | 12/2022 | Oettli | E21B 37/00 |
| 2023/0383649 | A1 * | 11/2023 | Valero | E21B 33/1243 |

OTHER PUBLICATIONS

International Search Report and Written Opinion issued in the PCT Application No. PCT/US2023/023235 dated Sep. 15, 2023, 12 pages.

\* cited by examiner

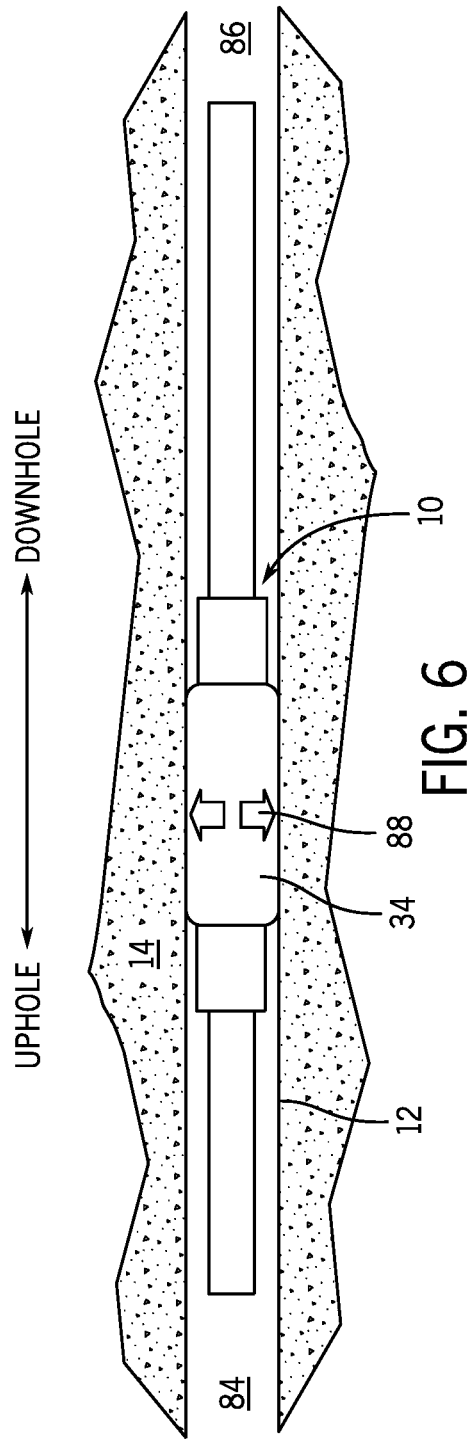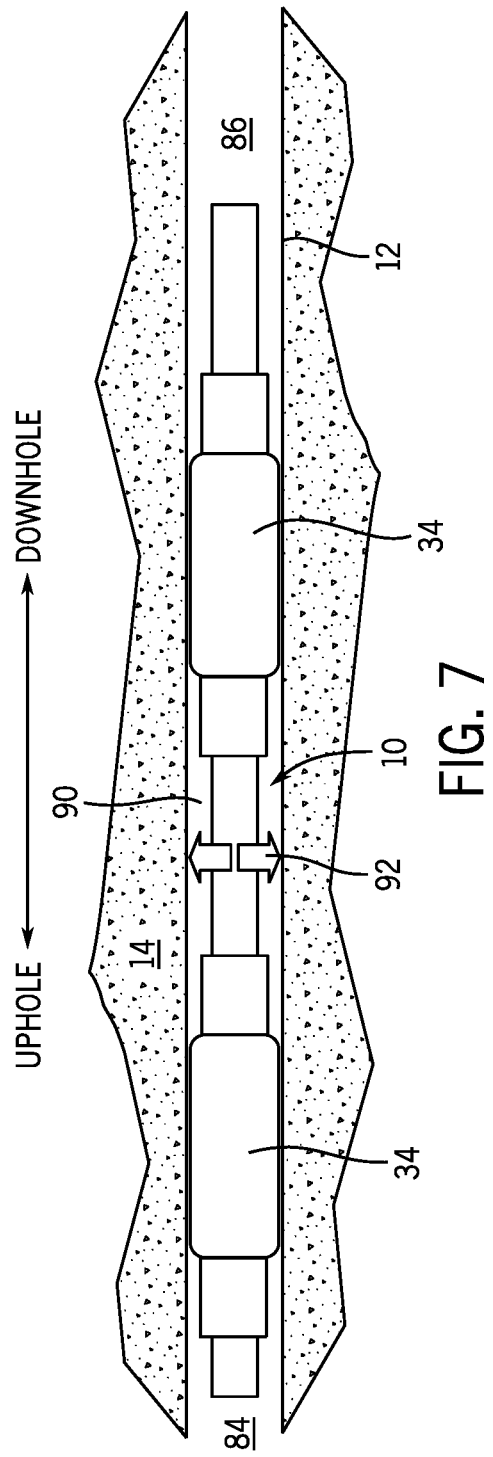

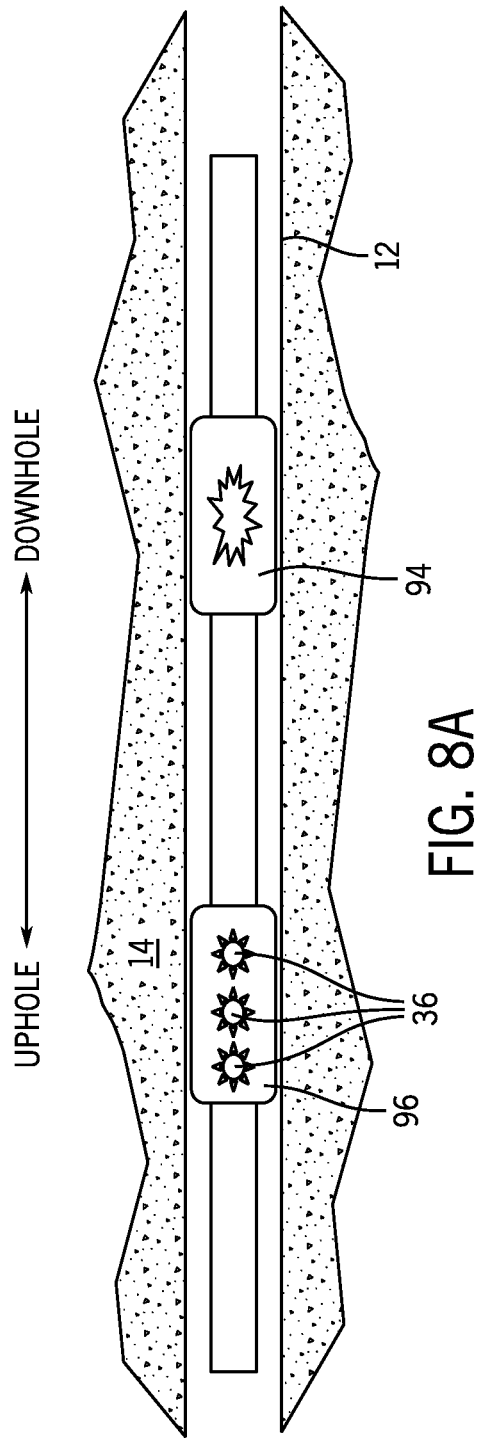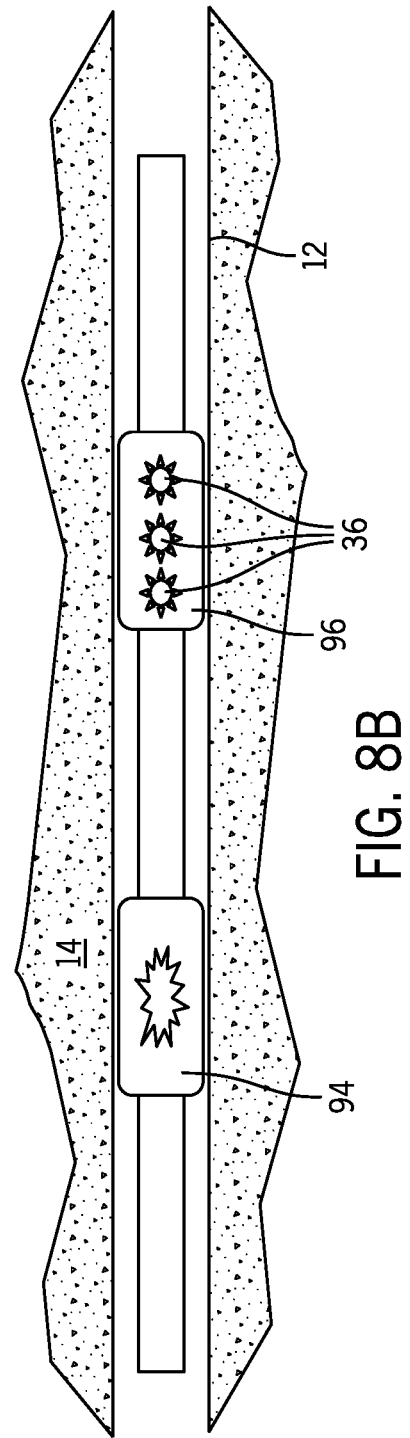
FIG. 8A
FIG. 8B

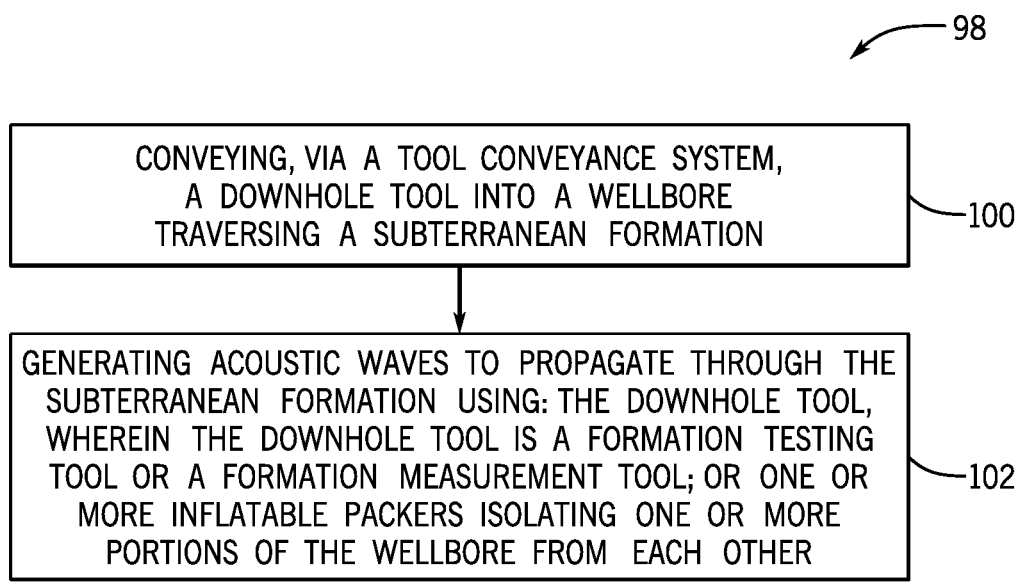

DOWNHOLE ACOUSTIC WAVE GENERATION SYSTEMS AND METHODS

BACKGROUND

The present disclosure generally relates to systems and methods for generating acoustic waves downhole within wellbores using downhole tools and associated equipment that typically are not configured to generate such acoustic waves.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Acoustic waves are often generated using downhole tools disposed within wellbores for the purpose of acoustic stimulation of subterranean formations through which the wellbores traverse, as well as for analyzing the subterranean formations. Typically, such downhole tools are specifically designed to generate such acoustic waves. However, it has been observed that the ability to generate acoustic waves using downhole tools that are not specifically designed to do so (e.g., that perform other downhole functions) may prove beneficial by, for example, obviating the need for additional downhole tools and additional runs into the wellbore.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method includes conveying, via a tool conveyance system, a downhole tool into a wellbore traversing a subterranean formation. The method also includes generating acoustic waves to propagate through the subterranean formation using: the downhole tool, wherein the downhole tool is a formation testing tool or a formation measurement tool; or one or more inflatable packers isolating one or more portions of the wellbore from each other.

Certain embodiments of the present disclosure also include a formation testing or measurement tool system that includes a formation testing or measurement tool configured to analyze a subterranean formation when the formation testing or measurement tool is disposed within a wellbore traversing the subterranean formation. The formation testing or measurement tool system also includes one or more control systems configured to control generation of acoustic waves from the formation testing or measurement tool.

Certain embodiments of the present disclosure also include a downhole tool system includes a downhole tool configured to be conveyed by a tool conveyance system into a wellbore traversing a subterranean formation. The downhole tool system also includes one or more inflatable packers configured to isolate one or more portions of the wellbore from each other. The downhole tool system further includes one or more control systems configured to control generation of acoustic waves from the one or more inflatable packers.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which:

FIG. 6 illustrates an inflatable packer disposed around a downhole tool and inflated to contact a wellbore, in accordance with embodiments of the present disclosure;

FIG. 7 illustrates two inflatable packers disposed around a downhole tool and inflated to contact a wellbore, in accordance with embodiments of the present disclosure;

FIG. 8A illustrates an embodiment where an acoustic energy source is positioned below an acoustic tool having one or more acoustic receivers, in accordance with embodiments of the present disclosure;

FIG. 8B illustrates an embodiment where the acoustic energy source is positioned above an acoustic tool having one or more acoustic receivers, in accordance with embodiments of the present disclosure;

FIG. 10 is a flow diagram of a process for generating acoustic waves, in accordance with embodiments of the present disclosure.

DETAILED DESCRIPTION

Figure 1:
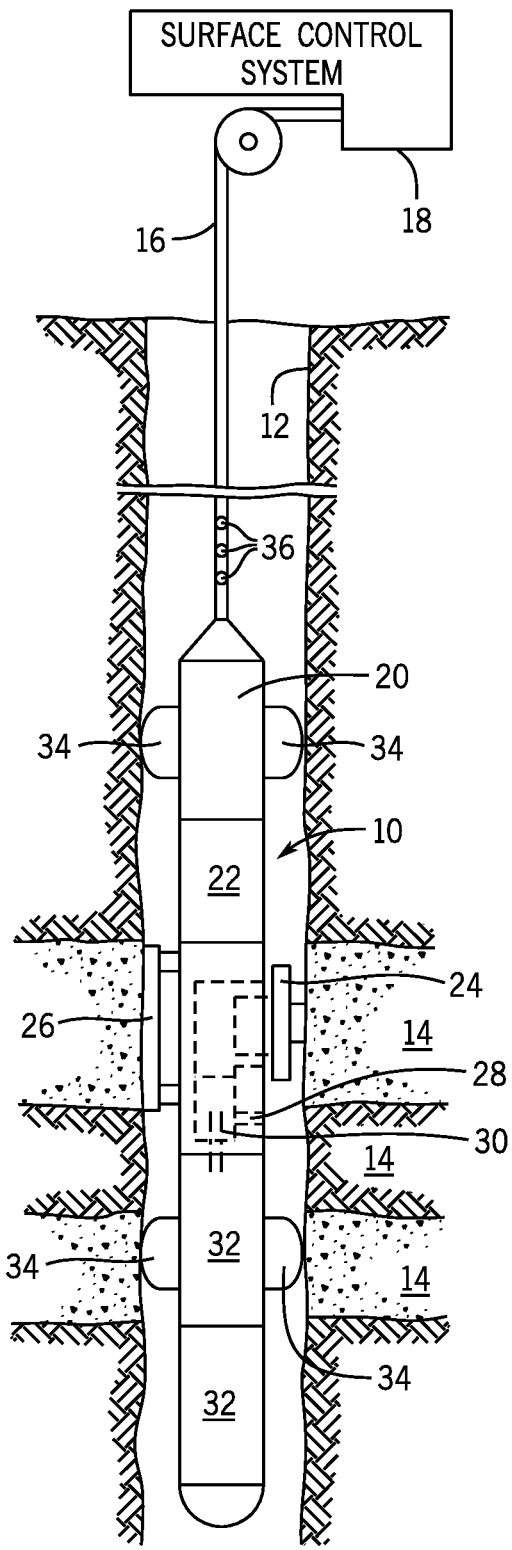
FIG. 1 illustrates a downhole tool being suspended in a wellbore traversing a formation by a cable, in accordance with embodiments of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequently, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention).

The embodiments described herein provide for the generation of acoustic waves for acoustic stimulation, as well as for analysis of subterranean formations, using downhole tools and associated equipment that are not conventionally designed to do so. For example, in certain embodiments, formation testing tools, formation measurement tools, inflatable packers, and so forth, may be controlled by control systems to, for example, create pressure pulses that generate the acoustic waves. In addition, in certain embodiments, a tool conveyance system that conveys a formation testing tool into a wellbore may include acoustic receivers that may detect the acoustic waves after they reflect from subterranean features of the formation.

FIG. 1 illustrates a downhole tool 10 being suspended in a wellbore 12 traversing a subterranean formation 14 by a cable 16 that is spooled in a usual fashion on a suitable winch (not shown) on the formation surface. On the surface, the cable 16 may be electrically coupled to a surface control system 18 that is configured to at least partially control operation of the downhole tool 10 by communicating data and control signals to and from the downhole tool 10 via the cable 16, as described in greater detail herein. Although described primarily herein as using a cable 16 (e.g., wireline cable) to convey the downhole tool 10 into the wellbore 12, in other embodiments, other types of tool conveyance systems may be used to convey the downhole tool 10 into the wellbore 12, such as coiled tubing, pipe conveyance, and so forth. As illustrated, in certain embodiments, the downhole tool 10 includes an elongated body 20 that encloses a tool control system 22 that is configured to communicate with the surface control system 18 for the purpose of controlling operation of the downhole tool 10, as described in greater detail herein.

In particular, as described in greater detail herein, the downhole tool 10 may be a formation testing or measurement tool 10, and the elongated body 20 may include a fluid admitting assembly 24 and a tool anchoring member 26, which may be arranged on opposite lateral sides of the body 20. In certain embodiments, the fluid admitting assembly 24 is configured to selectively seal off or isolate selected portions of the wall of the wellbore 12 such that pressure or fluid communication with the adjacent formation 14 is established. In addition, in certain embodiments, the formation testing or measurement tool 10 includes a fluid analysis module 28 with a flow line 30 through which fluid collected from the formation 14 flows. The fluid may thereafter be expelled through a port (not shown) or may be directed to one or more fluid collecting chambers 32, which may receive and retain the fluids collected from the formation 14 or wellbore 12. As described in greater detail herein, the fluid admitting assembly 24, the fluid analysis module 28, and the flow path to the fluid collecting chambers 32 may be controlled by the control systems 18, 22.

In addition, in certain embodiments, the formation testing or measurement tool 10 may be associated with one or more inflatable packers 34 that are configured to inflate against the wellbore 12 to, for example, provide a seal between the inflatable packers 34 and the wellbore 12. In addition, in certain embodiments, the one or more inflatable packers 34 may isolate portions of the wellbore 12 to facilitate the collection of fluids via the formation testing or measurement tool 10. Although illustrated in FIG. 1 as including a formation testing or measurement tool 10 held in place within the wellbore 12 by one or more inflatable packers 34, in other embodiments, one or more inflatable packers 34 may isolate other types of downhole tools 10 within the wellbore 12.

As described in greater detail herein, the formation testing or measurement tool 10 and/or the inflatable packers 34 may be used to generate acoustic waves that may be propagated through the formation 14 for enhanced oil recovery. In addition, in certain embodiments, the generated acoustic waves may be detected by one or more acoustic receivers 36 for the purpose of characterizing the formation 14. For example, in certain embodiments, the one or more acoustic receivers 36 may be disposed along an axial length of the cable 16. In certain embodiments, instead of the one or more acoustic receivers 36 being active or passive receivers disposed on the cable 16, the one or more acoustic receivers 36 may be part of the cable 16 itself (e.g., distributed sensors, fiber optics, and so forth). In conventional oil and gas systems, formation testing tools 10 are inflatable packers 34 are passive elements. However, in contrast, the formation testing or measurement tool 10 and/or the inflatable packers 34 described herein actively generate acoustic waves.

Figure 2:
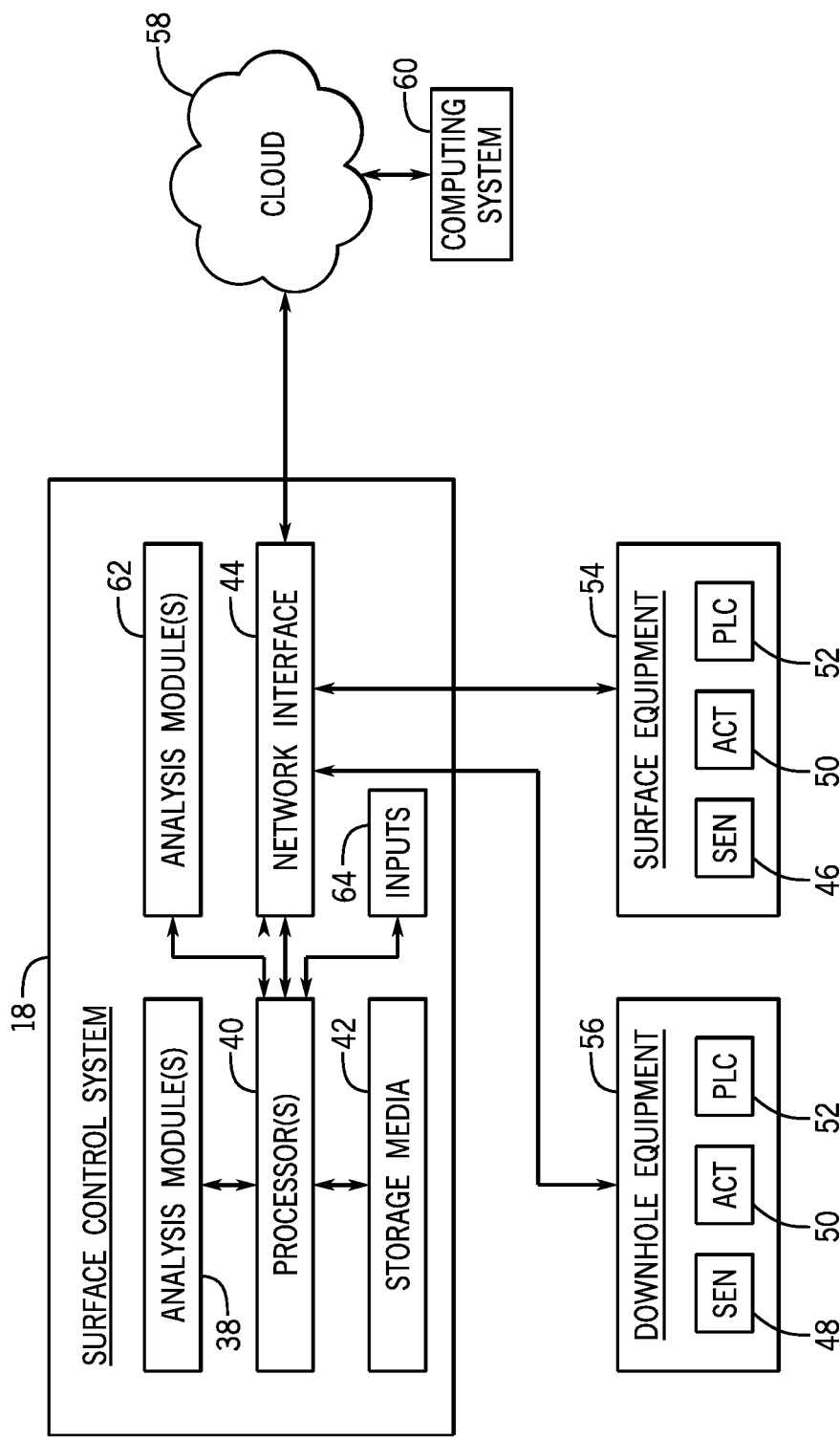
FIG. 2 illustrates a surface control system that may control the oil and gas well system of FIG. 1, in accordance with embodiments of the present disclosure.

FIG. 2 illustrates an embodiment of the surface control system 18 illustrated in FIG. 1. In certain embodiments, the surface control system 18 may include one or more analysis modules 38 (e.g., a program of processor executable instructions and associated data) that may be configured to perform various functions of the embodiments described herein. In certain embodiments, to perform these various functions, an analysis module 38 executes on one or more processors 40 of the surface control system 18, which may be connected to one or more storage media 42 of the surface control system 18. Indeed, in certain embodiments, the one or more analysis modules 38 may be stored in the one or more storage media 42.

In certain embodiments, the one or more processors 40 may include a microprocessor, a microcontroller, a processor module or subsystem, a programmable integrated circuit, a programmable gate array, a digital signal processor (DSP), or another control or computing device. In certain embodiments, the one or more storage media 42 may be implemented as one or more non-transitory computer-readable or machine-readable storage media. In addition, in certain embodiments, the one or more storage media 42 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the processor-executable instructions and associated data of the analysis module(s) 38 may be provided on one computer-readable or machine-readable storage medium of the storage media 42 or, alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 42 may be located either in the machine running the machine-readable instructions, or may be located at a remote site from which machine-readable instructions may be downloaded over a network for execution.

In certain embodiments, the processor(s) 40 may be connected to a network interface 44 of the surface control system 18 to allow the surface control system 18 to communicate with various surface sensors 46 and/or downhole sensors 48 described herein, as well as communicate with various actuators 50 and/or PLCs 52 of surface equipment 54 (e.g., surface pumps, valves, and so forth) and/or of downhole equipment 56 (e.g., the formation testing or measurement tool 10, the inflatable packers 34, electric submersible pumps, other downhole tools, and so forth) for the purpose of controlling operation of the oil and gas well system illustrated in FIG. 1. In certain embodiments, the network interface 44 may also facilitate the surface control system 18 to communicate data to a cloud-based service 58 (or other wired and/or wireless communication network) to, for example, archive the data or to enable external computing systems 60 (e.g., cloud-based computing systems, in certain embodiments) to access the data and/or to remotely interact with the surface control system 18. For example, in certain embodiments, some or all of the analysis modules 38 described in greater detail herein may be executed via cloud and edge deployments.

In certain embodiments, the surface control system 18 may include a display 62 configured to display a graphical user interface to present results of the operations described herein. In addition, in certain embodiments, the graphical user interface may present other information to operators of the equipment 54, 56 described herein. For example, the graphical user interface may include a dashboard configured to present visual information to the operators. In certain embodiments, the dashboard may show live (e.g., real-time) data as well as the results of the operations described herein.

In addition, in certain embodiments, the surface control system 18 may include one or more input devices 64 configured to enable operators to, for example, provide commands to the equipment 54, 56 described herein. For example, in certain embodiments, the formation testing or measurement tool 10 may provide information to the operators regarding the formation testing operations, and the operators may implement actions relating to the formation testing operations by manipulating the one or more input devices 64, as described in greater detail herein. In certain embodiments, the display 62 may include a touch screen interface configured to receive inputs from operators. For example, an operator may directly provide instructions to the formation testing or measurement tool 10 via the user interface, and the instructions may be output to the formation testing or measurement tool 10 via a controller and a communication system of the formation testing or measurement tool 10.

It should be appreciated that the surface control system 18 illustrated in FIG. 2 is only one example of a well control system, and that the surface control system 18 may have more or fewer components than shown, may combine additional components not depicted in the embodiment of FIG. 2, and/or the surface control system 18 may have a different configuration or arrangement of the components depicted in FIG. 2. In addition, the various components illustrated in FIG. 2 may be implemented in hardware, software, or a combination of both hardware and software, including one or more signal processing and/or application specific integrated circuits. Furthermore, the operations of the surface control system 18 as described herein may be implemented by running one or more functional modules in an information processing apparatus such as application specific chips, such as application-specific integrated circuits (ASICs), field-programmable gate arrays (FPGAs), programmable logic devices (PLDs), systems on a chip (SOCs), or other appropriate devices. These modules, combinations of these modules, and/or their combination with hardware are all included within the scope of the embodiments described herein.

In addition, as described above, the formation testing or measurement tool 10 includes a tool control system 22 (not shown) that controls the local functionality of the formation testing or measurement tool 10 and, in certain embodiments, the inflatable packers 34, as described in greater detail herein. In certain embodiments, the tool control system 22 of the formation testing or measurement tool 10 may communicate with the surface control system 18 such that the control systems 18, 22 collectively control operation of the formation testing or measurement tool 10 and/or the inflatable packers 34. As will be appreciated, the tool control system 22 of the formation testing or measurement tool 10 may include components that are substantially similar to the components of the surface control system 18 illustrated in FIG. 2, other than the display 62 and the input devices 64.

Figure 3:
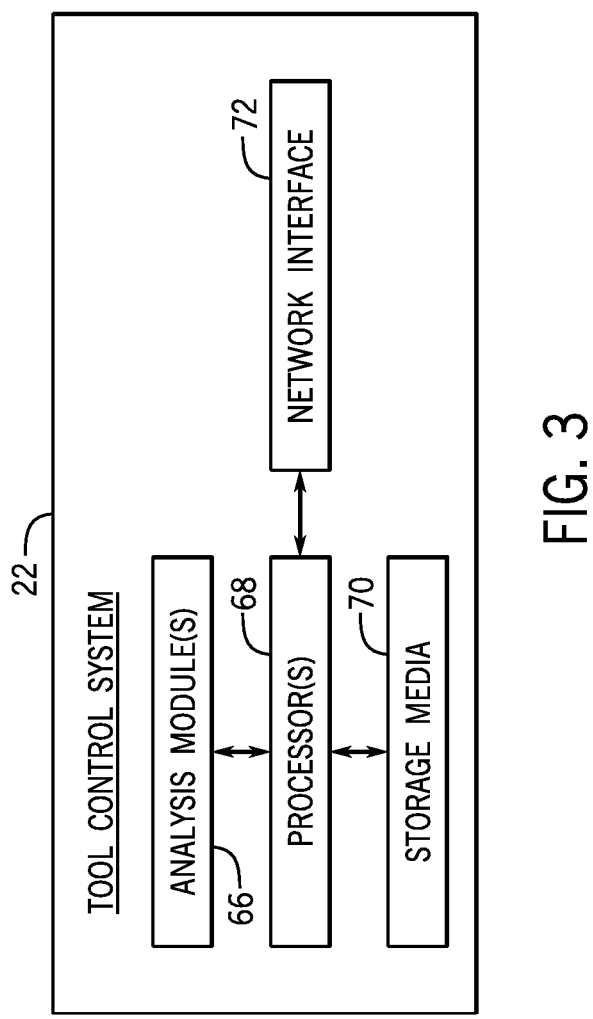
FIG. 3 illustrates an embodiment of a tool control system illustrated in FIG. 1, in accordance with embodiments of the present disclosure.

FIG. 3 illustrates an embodiment of the tool control system 22 illustrated in FIG. 1. In certain embodiments, the tool control system 22 may include one or more analysis modules 66 (e.g., a program of processor executable instructions and associated data) that may be configured to perform various functions of the embodiments described herein. In certain embodiments, to perform these various functions, an analysis module 66 executes on one or more processors 68 of the tool control system 22, which may be connected to one or more storage media 70 of the tool control system 22. Indeed, in certain embodiments, the one or more analysis modules 66 may be stored in the one or more storage media 70.

In certain embodiments, the one or more processors 68 may include a microprocessor, a microcontroller, a processor module or subsystem, a programmable integrated circuit, a programmable gate array, a digital signal processor (DSP), or another control or computing device. In certain embodiments, the one or more storage media 70 may be implemented as one or more non-transitory computer-readable or machine-readable storage media. In addition, in certain embodiments, the one or more storage media 70 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; or other types of storage devices. Such computer-readable or machine-readable storage medium or media are considered to be part of an article (or article of manufacture), which may refer to any manufactured single component or multiple components. In addition, in certain embodiments, the processor(s) 68 may be connected to a network interface 72 of the tool control system 22 to allow the tool control system 22 to communicate with the surface control system 18.

Figure 4:
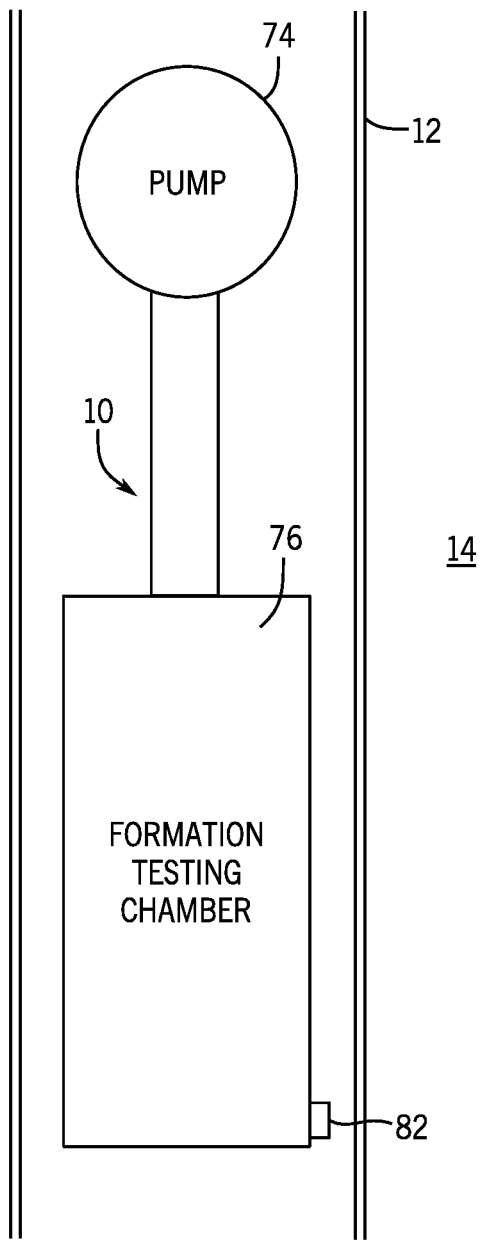
FIG. 4 illustrates a simplified view of certain components of the formation testing tool, in accordance with embodiments of the present disclosure.

As described above, the embodiments described herein include a formation testing or measurement tool 10 configured to perform reservoir fluid analysis by drawing in formation fluid and testing the formation fluid downhole or collecting a sample of the formation fluid to bring to the surface. For example, in certain embodiments, the formation testing or measurement tool 10 may use the inflatable packers 34 to isolate a desired region of the wellbore 12 (e.g., at a desired depth) and establish fluid communication with the subterranean formation 14 surrounding the wellbore 12. In addition, as described in greater detail herein, the formation testing or measurement tool 10 and/or the inflatable packers 34 illustrated in FIG. 1 may be used to generate acoustic waves for enhanced oil recovery and/or for use to characterize the formation 14 within which the formation testing or measurement tool 10 and/or inflatable packers 34 are disposed within the wellbore 12. For example, FIG. 4 illustrates a simplified view of certain components of the formation testing or measurement tool 10. Specifically, a pump 74 of the formation testing or measurement tool 10 may help draw sample fluids into the formation testing or measurement tool 10, which may be analyzed by the tool control system 22 while the sample fluids are disposed in a formation testing chamber 76 of the formation testing or measurement tool 10.

Figure 5:
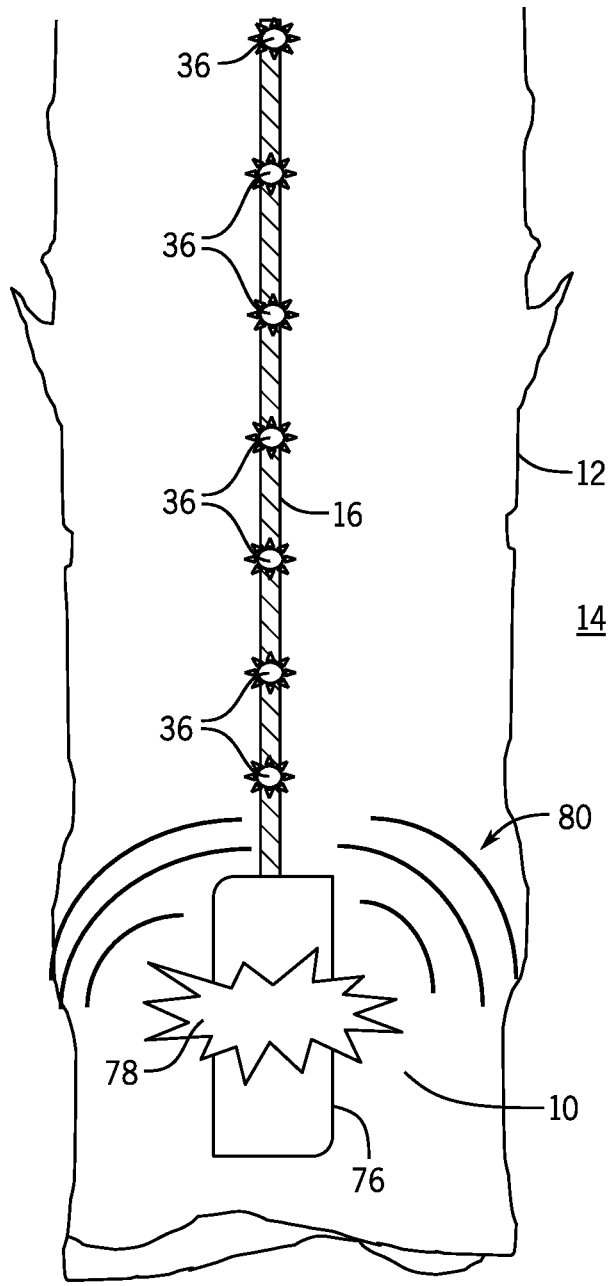
FIG. 5 illustrates a formation testing tool generating acoustic waves, in accordance with embodiments of the present disclosure.

In addition to facilitating the flow of the sample fluids into the formation testing chamber 76, in certain embodiments, the pump 74 may be used to generate the acoustic waves. For example, in such embodiments, the tool control system 22 (and/or the surface control system 18) may send control signals to the pump 74 to pulse a pressure of the pump 74 being used to control the flow of the sample fluids through the formation testing or measurement tool 10. In addition, in certain embodiments, the tool control system 22 (and/or the surface control system 18) may send control signals to the pump 74, to valves associated with the formation testing chamber 76, and so forth, to control the pressure, flow rates, and so forth, of the sample fluids to pulse 78 the sample fluids, thereby generating acoustic waves 80, which may be propagated through the formation 14, as described in greater detail herein. For example, in certain embodiments, the tool control system 22 (and/or the surface control system 18) may control a pressure of the sample fluids within the formation testing chamber 76, a pressure of the sample fluids exiting through a drain port 82 of the formation testing or measurement tool 10, or other pressures of the sample fluids within the formation testing or measurement tool 10. As illustrated in FIG. 5, in certain embodiments, the acoustic waves 80 may be detected by one or more acoustic receivers 36 that are part of the cable 16 that conveys the formation testing or measurement tool 10 into the wellbore 12. In turn, the acoustic receivers 36 may transmit data relating to the detection of the acoustic waves to the surface control system 18 and/or the tool control system 22. Although described primarily herein as using a cable 16 (e.g., wireline cable) to convey the downhole tool 10 into the wellbore 12, in other embodiments, other types of tool conveyance systems may be used to convey the downhole tool 10 into the wellbore 12, such as coiled tubing, pipe conveyance, and so forth, and these other types of tool conveyance systems may include the one or more acoustic receivers 36 described herein.

In addition, in certain embodiments, acoustic waves may be generated in the formation 14 by pulsing the pressure used to inflate the inflatable packers 34 and/or by pulsing the pressure created within the wellbore 12 between two inflatable packers 34. For example, FIG. 6 illustrates an inflatable packer 34 disposed around a downhole tool 10 (e.g., the formation testing or measurement tool 10 illustrated in FIGS. 1, 4, and 5) and inflated to contact the wellbore 12 for the purpose of creating a seal against the wellbore 12 to isolate an uphole axial side 84 of the downhole tool 10 from a downhole axial side 86 of the downhole tool 10 within the wellbore 12. In certain embodiments, the inflation pressure 88 used to inflate the inflatable packer 34 and to maintain the sealing force against the wellbore 12 created by the inflatable packer 34 may be pulsed to generate the acoustic waves propagated through the formation 14. In particular, in certain embodiments, the tool control system 22 (and/or the surface control system 18) may control the inflation pressure 88 within an inflatable bladder of the inflatable packer 34 to generate pulses within the inflatable bladder, which may then propagate through the formation 14. Similar to the embodiment illustrated in FIG. 5, in certain embodiments, the acoustic waves generated by the inflatable packer 34 may be detected by one or more acoustic receivers 36 that are part of the cable 16 that conveys the formation testing or measurement tool 10 into the wellbore 12. In turn, the acoustic receivers 36 may transmit data relating to the detection of the acoustic waves to the surface control system 18 and/or the tool control system 22.

As another example, FIG. 7 illustrates two inflatable packers 34 disposed around a downhole tool 10 (e.g., the formation testing or measurement tool 10 illustrated in FIGS. 1, 4, and 5) and inflated to contact the wellbore 12 for the purpose of creating a seal against the wellbore 12 to isolate an uphole axial side 84 of the downhole tool 10 from a downhole axial side 86 of the downhole tool 10 within the wellbore 12, as well as isolate an intermediate portion 90 of the wellbore 12 between the two inflatable packers 34. In certain embodiments, the wellbore pressure 92 within the intermediate portion 90 of the wellbore 12 may be pulsed to generate the acoustic waves propagated through the formation 14. In particular, in certain embodiments, the tool control system 22 (and/or the surface control system 18) may control the wellbore pressure 92 within the intermediate portion 90 of the wellbore 12 to generate pressure pulses within the intermediate portion 90 of the wellbore 12, which may then propagate through the formation 14. Similar to the embodiment illustrated in FIG. 5, in certain embodiments, the acoustic waves generated by the wellbore pressure 92 may be detected by one or more acoustic receivers 36 that are part of the cable 16 that conveys the formation testing or measurement tool 10 into the wellbore 12. In turn, the acoustic receivers 36 may transmit data relating to the detection of the acoustic waves to the surface control system 18 and/or the tool control system 22.

In addition, in other embodiments, other types of downhole tools 10 may be used to generate the acoustic waves described herein. For example, in certain embodiments, a formation measurement tool 10, such as a formation pressure-while-drilling (FPWD) tool like the StethoScope tool or other measurement-while-drilling downhole tool, may be used as a source of acoustic energy. For example, a cable (e.g., a wireline cable or fiber optic cable) may be run inside drilling pipe (i.e., pump down) with a geophone tool. In such embodiments, the formation measurement tool 10 may be used as an acoustic source by, for example, manipulating a drain port of the formation measurement tool 10, and data may be recorded in the formation measurement tool 10 above the bottomhole assembly (BHA).

Although described with respect to FIGS. 4 through 7 as creating pressure pulses to generate the acoustic waves described herein, in other embodiments, other methods may be used to generate the acoustic waves. For example, in certain embodiments, electromagnetic impacts creating by a downhole tool 10 may be used to generate acoustic waves. In addition, in certain embodiments, the tool control system 22 (and/or the surface control system 18) may synchronize the triggering of the acoustic waves using the embodiments illustrated in FIGS. 4 through 7 to ensure that the acoustic waves that are detected by the acoustic receivers 36 of the cable 16 (or other acoustic detectors), which are reflected from subterranean features of the formation 14, are correctly correlated with the triggering of the acoustic waves. In addition, in certain embodiments, the tool control system 22 (and/or the surface control system 18) may automatically determine and implement the timing of the acoustic waves based on feedback received from the acoustic receivers 36 (or other acoustic detectors) through the cable 16.

Although described primarily herein as including an acoustic energy source 94 (e.g., a formation testing or measurement tool 10, one or more inflatable packers 34, and so forth) positioned in a wellbore 12 below a cable 16 that includes one or more acoustic receivers 36 for detecting acoustic waves from the energy source, in other embodiments, the acoustic energy source 94 may instead be positioned in the wellbore 12 above the one or more acoustic receivers 36. For example, in certain embodiments, instead of having the one or more acoustic receivers 36 as part of a cable 16, the one or more acoustic receivers 36 may instead be part of an acoustic tool that is specifically configured to detect and/or generate acoustic waves, and which may be positioned in the wellbore 12 above or below the acoustic energy source 94. FIG. 8A illustrates an embodiment where an acoustic energy source 94 is positioned below an acoustic tool 96 having one or more acoustic receivers 36, and FIG. 8B illustrates an embodiment where the acoustic energy source 94 is positioned above an acoustic tool 96 having one or more acoustic receivers 36.

Figure 9:
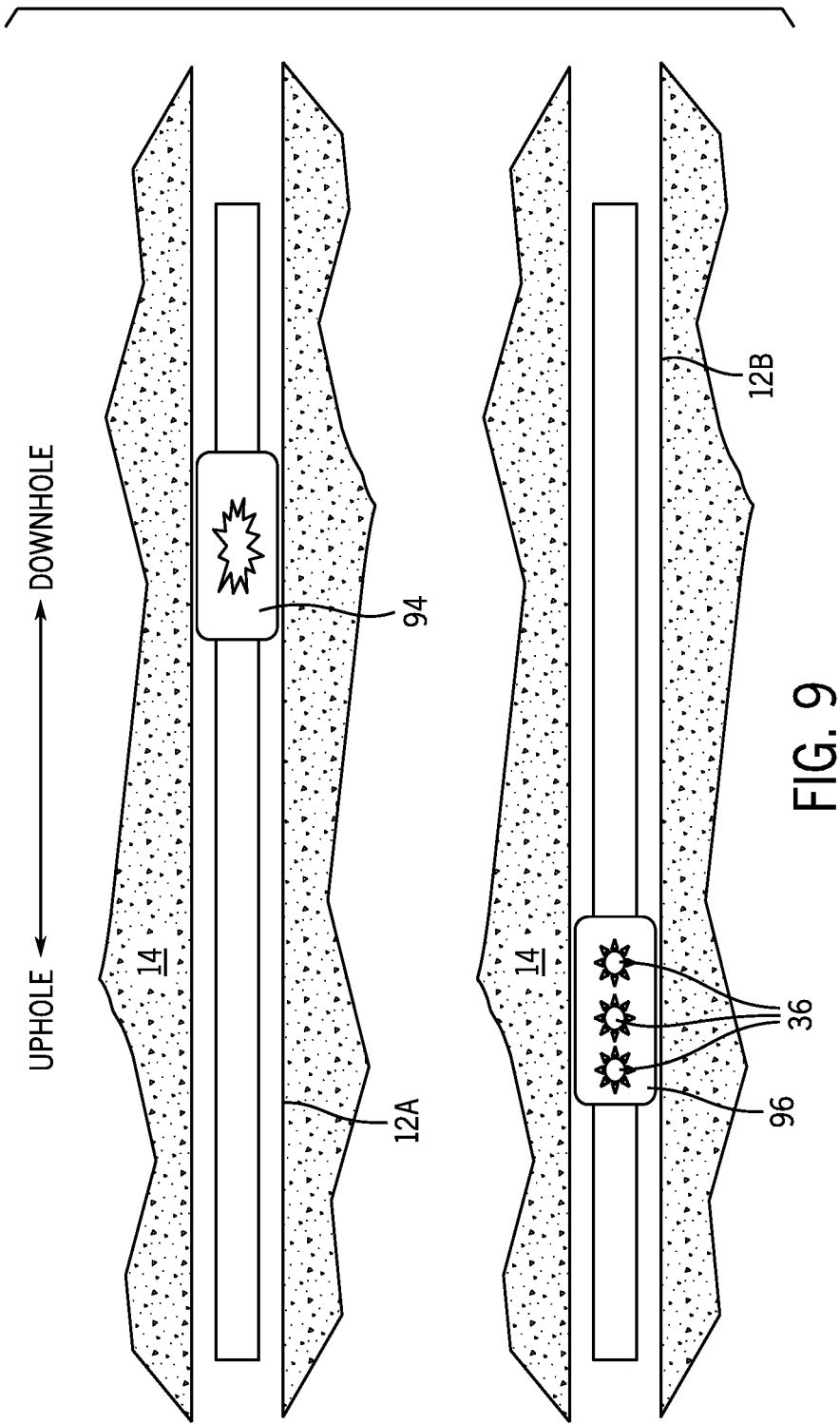
FIG. 9 illustrates an embodiment where the acoustic energy source is disposed in a first wellbore and the acoustic receivers are disposed in a second, nearby wellbore, in accordance with embodiments of the present disclosure.

In addition, instead of using acoustic receivers 36 disposed in the same wellbore 12 as the acoustic energy source 94, in other embodiments, acoustic receivers 36 disposed in one or more wellbores 12 other than the wellbore 12 within which the acoustic energy source 94 is disposed may be used to detect acoustic waves generated by the acoustic energy source 94. For example, FIG. 9 illustrates an embodiment where the acoustic energy source 94 is disposed in a first wellbore 12A and the acoustic receivers 36 are disposed in a second, nearby wellbore 12B. It will be appreciated that any number of acoustic energy sources 94 may be used in any number of wellbores 12A and any number of acoustic receivers 36 may be used in any number of wellbore 12B.

FIG. 10 is a flow diagram of a process 98 for generating acoustic waves, as described in greater detail herein. In certain embodiments, the process 98 includes conveying, via a tool conveyance system 16, a downhole tool 10 into a wellbore 12 traversing a subterranean formation 14 (block 100). In addition, in certain embodiments, the process 98 includes generating acoustic waves to propagate through the subterranean formation 14 using: the downhole tool 10, wherein the downhole tool 10 is a formation testing or measurement tool 10; or one or more inflatable packers 34 isolating one or more portions of the wellbore 12 from each other (block 102).

In addition, in certain embodiments, the process 98 may include generating the acoustic waves using the formation testing or measurement tool 10 by pulsing a pressure of a pump 74 that is pumping a sample fluid through the formation testing or measurement tool 10. In addition, in certain embodiments, the process 98 may include generating the acoustic waves using the formation testing or measurement tool 10 by pulsing a pressure within a formation testing chamber 76 of the formation testing or measurement tool 10. In addition, in certain embodiments, the process 98 may include generating the acoustic waves using the formation testing or measurement tool 10 by pulsing a pressure through a drain port 82 of the formation testing or measurement tool 10. In certain embodiments, the formation testing or measurement tool 10 may be a measurement-while-drilling tool.

In addition, in certain embodiments, the process 98 may include generating the acoustic waves by pulsing an inflation pressure 88 of an inflatable packer 34 of the one or more inflatable packers 34. In addition, in certain embodiments, the process 98 may include generating the acoustic waves by pulsing a wellbore pressure 92 within the wellbore 12 between two inflatable packers 34 of the one or more inflatable packers 34.

In addition, in certain embodiments, the process 98 may include detecting, using one or more acoustic receivers 36 of the tool conveyance system 16, the acoustic waves. In addition, in certain embodiments, the process 98 may include detecting, using one or more receivers 36 disposed within the wellbore 12, the acoustic waves. In addition, in certain embodiments, the process 98 may include detecting, using one or more receivers 36 disposed within another wellbore 12 traversing the subterranean formation 14, the acoustic waves.

In addition, in certain embodiments, the process 98 may include controlling generation of the acoustic waves using one or more control systems 18, 22. In certain embodiments, the one or more control systems 18, 22 may include a tool control system 22 of the downhole tool 10. In addition, in certain embodiments, the one or more control systems 18, 22 may include a surface control system 18 located at a surface of the subterranean formation 14.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method, comprising:
    conveying, via a tool conveyance system, a downhole tool into a wellbore traversing a subterranean formation, wherein the tool conveyance system comprises one or more acoustic receivers;
    generating acoustic waves to propagate through the subterranean formation using the downhole tool, wherein the downhole tool is a formation testing tool or a formation measurement tool, and wherein generating comprises a one of pulsing a pressure of a pump that is pumping a sample fluid through the formation testing tool and pulsing a pressure through a drain port of the formation testing tool;
    controlling generation of the acoustic waves utilizing at least one of a tool control system and a surface control system; and
    detecting, using one or more acoustic receivers of the tool conveyance system, the acoustic waves.

2. The method of claim 1, comprising generating the acoustic waves using the formation testing tool by pulsing a pressure within a formation testing chamber of the formation testing tool.

3. The method of claim 1, wherein the formation measurement tool comprises a measurement-while-drilling tool.

4. The method of claim 1, wherein the tool conveyance system comprises a cable and wherein detecting comprises detecting the acoustic waves with one or more acoustic receivers disposed along an axial length of the cable.

5. The method of claim 1, comprising detecting, using one or more receivers disposed within the wellbore separate from the tool conveyance system, the acoustic waves.

6. The method of claim 1, further comprising transmitting data from the acoustic receivers relating to the detection of the acoustic waves to the surface control system and/or the tool control system and characterizing the formation.

7. A formation testing or measurement tool system, comprising:
    a formation testing or measurement testing tool configured to analyze a subterranean formation when the formation testing or measurement tool is disposed within a wellbore traversing the subterranean formation;
    one or more control systems configured to control generation of acoustic waves from the formation testing or measurement tool, wherein the one or more control systems are configured to control generation of the acoustic waves from the formation testing or measurement tool by pulsing a pressure of a pump that is pumping a sample fluid through the formation testing or measurement tool; and
    one or more acoustic receivers disposed remotely from the formation testing or measurement testing tool and configured to detect the acoustic waves and transmit data related to the detection of the acoustic waves to the one or more control systems.

8. The formation testing or measurement tool system of claim 7, wherein the one or more control systems are configured to control generation of the acoustic waves from the formation testing or measurement tool by pulsing a pressure within a formation testing chamber of the formation testing or measurement tool.

9. A method, comprising:
    conveying, via a tool conveyance system, a downhole tool into a wellbore traversing a subterranean formation, wherein the tool conveyance system comprises one or more acoustic receivers;
    generating acoustic waves to propagate through the subterranean formation using the downhole tool, wherein the downhole tool is a formation testing tool or a formation measurement tool, and wherein generating comprises generating the acoustic waves using the formation testing tool by pulsing a pressure through a drain port of the formation testing or measurement tool;
    controlling generation of the acoustic waves utilizing at least one of a tool control system and a surface control system; and
    detecting, using one or more acoustic receivers of the tool conveyance system, the acoustic waves.

10. The method of claim 9, further comprising transmitting data from the acoustic receivers relating to the detection of the acoustic waves to the surface control system and/or the tool control system and characterizing the formation.

11. A formation testing or measurement tool system, comprising:
    a formation testing or measurement testing tool configured to analyze a subterranean formation when the formation testing or measurement tool is disposed within a wellbore traversing the subterranean formation;
    one or more control systems configured to control generation of acoustic waves from the formation testing or measurement tool, wherein the one or more control systems are configured to control generation of the acoustic waves from the formation testing or measurement tool by pulsing a pressure through a drain port of the formation testing or measurement tool; and
    one or more acoustic receivers disposed remotely from the formation testing or measurement testing tool and configured to detect the acoustic waves and transmit data related to the detection of the acoustic waves to the one or more control systems.

* * * * *